US007408842B2

(12) United States Patent
Caiazzo

(10) Patent No.: US 7,408,842 B2
(45) Date of Patent: Aug. 5, 2008

(54) SONAR DOME

(75) Inventor: Anthony A. Caiazzo, Chalfont, PA (US)

(73) Assignee: Materials Sciences Corporation, Horsham, PA (US)

( * ) Notice: Subject to any disclaimer, the term of this patent is extended or adjusted under 35 U.S.C. 154(b) by 237 days.

(21) Appl. No.: 11/394,329

(22) Filed: Mar. 30, 2006

(65) Prior Publication Data

US 2007/0230279 A1 Oct. 4, 2007

(51) Int. Cl.
*H04B 11/00* (2006.01)
*E04B 1/84* (2006.01)

(52) U.S. Cl. ....................... 367/176; 367/191; 181/294; 181/198

(58) Field of Classification Search ..................... 367/1, 367/176, 191; 181/198, 290, 294
See application file for complete search history.

(56) References Cited

U.S. PATENT DOCUMENTS 3,038,551 A * 6/1962 McCoy et al. ............... 367/176
3,120,875 A * 2/1964 Graner ....................... 181/198
3,123,176 A * 3/1964 Greenberg .................. 181/198
3,136,380 A * 6/1964 McCoy et al. ............... 367/141
3,757,888 A * 9/1973 Lagier et al. ................ 181/198
3,858,165 A * 12/1974 Pegg .......................... 367/173
4,685,090 A 8/1987 Krevor ........................ 367/20
4,770,267 A 9/1988 Hauser ....................... 181/0.5
4,770,926 A 9/1988 Yamamura et al. .......... 428/224
4,784,898 A 11/1988 Raghava ..................... 428/225
4,818,579 A 4/1989 Uchida ....................... 428/102
5,289,436 A 2/1994 Terhune ...................... 367/191
5,382,286 A 1/1995 Fanning et al. .............. 106/162
5,747,672 A 5/1998 Parent et al. ............... 73/61.79
6,172,163 B1 1/2001 Rein et al. .................. 525/240
6,269,763 B1 8/2001 Woodland ................... 114/382
6,298,012 B1 10/2001 Benjamin ................... 367/174
6,640,739 B2 11/2003 Woodall et al. ............. 114/312
6,643,222 B2 11/2003 Osborn et al. ............... 367/174
6,683,783 B1 1/2004 Smalley et al. .............. 361/502
2001/0031594 A1 10/2001 Perez et al. ................. 442/339
2002/0034124 A1 3/2002 Suppa et al. ................ 367/165
2002/0136683 A1 9/2002 Smalley et al. .............. 423/461

* cited by examiner

*Primary Examiner*—Ian J Lobo
(74) *Attorney, Agent, or Firm*—Lipton, Weinberger & Husick

(57) ABSTRACT

The Invention is a reinforced plastic sonar dome having a low acoustical insertion loss combined with sufficient mechanical strength. Acoustical and structural fibers are stochastically mixed and formed into a blended yarn. The blended yarn is woven into a blended fabric. The blended fabric is ordered into a stack having multiple layers of blended fabric. The blended fabric is incorporated into a polymer resin while the polymer resin is in liquid form using a vacuum assist. The acoustical fibers and the vacuum assist modify the acoustical properties of the resulting composite sonar dome.

20 Claims, 7 Drawing Sheets

SONAR DOME

BACKGROUND OF THE INVENTION

1. Field of the Invention

The Invention is a sonar dome for use by surface ships or submarines. The sonar dome of the Invention is composed of a composite fiber-reinforced plastic having a low acoustical insertion loss, particularly at high frequencies, coupled with high mechanical strength. The Invention is also a method of manufacture of the sonar dome.

2. Description of the Related Art

Acoustical energy, unlike light and radio energy, may be transmitted through the sea for considerable distances. Modern sonar utilizes acoustical energy for underwater communications, navigation or detection of submerged objects. Passive sonar uses underwater transducers to receive and locate sound generated by, for example, a submerged submarine. Active sonar uses underwater transducers to generate an acoustical signal that travels from the transducer through the sea and is reflected from an undersea object back to the transducer.

A sonar dome is an underwater structure mounted to a vessel, generally at the bow of the vessel. The sonar dome houses the sonar transducers and is flooded to acoustically couple the transducers with the surrounding sea. The purpose of the sonar dome is to protect the sonar transducers from mechanical force exerted by the seawater through which the vessel moves, to protect the transducers from damage caused by contact with objects such as piers, and to reduce the self-noise that would otherwise be generated by turbulent water flow past the transducers. A sonar dome can experience substantial shock loads from pounding of the bow as the vessel travels through rough seas. Mechanical strength therefore is a desirable quality of a sonar dome.

For passive sonar, sound generated by an undersea object passes through the seawater, through the sonar dome and through the water filling the sonar dome to reach the transducers. In active sonar, sound passes through the sonar dome twice—once on its way from the transducers to the undersea object and a second time as the reflected sound returns to the transducers. The acoustical properties of the sonar dome therefore are important to sonar performance.

One important acoustical property of any material is the material's "characteristic impedance." The characteristic impedance of a material depends in part on the speed of sound through the material and is analogous to electrical impedance of a component in an electrical circuit.

The portion of the sonar dome through which sound passes on its way from and to the transducers is referred to as the "window." Each location on the sonar dome window has a characteristic impedance, as does the seawater surrounding and filling the sonar dome. When a first material, such as a sonar dome window, meets a second material, such as sea water, and the two materials have dissimilar characteristic impedances, the boundary between the two is referred to as a "discontinuity."

When a sound wave traveling through sea water encounters the acoustical discontinuity at the boundary of the sea water and the sonar dome window, the sound wave will undergo an abrupt change in direction and speed. Depending on the angle of incidence and the abruptness of the change in speed of the sound wave, part of the acoustical energy will transfer across the discontinuity and into the material composing the window and part of the energy will be reflected back into the sea water adjoining the window. The portion of the sound wave that continues through the material composing the window will be refracted and will change direction.

The greater the difference in characteristic impedance between the sea water and the sonar dome window, the greater the change in direction of the acoustical energy and hence the greater the amount of acoustical energy that will be reflected away from sonar dome window. The greater the reflection of acoustical energy, the less efficient is the sonar system and the less likely the sonar system is to successfully perform its function. Matching the characteristic impedance of sea water as closely as possible is a desirable quality of a sonar dome window.

Periodic structure within a sonar dome window can cause interference effects resulting in phase cancellation and alteration of the wave form of the acoustical energy passing through the sonar dome window. The wavelength of high-frequency sound used for sonar may be as short as 1 mm. In a prior art reinforced plastic sonar dome, phase cancellation effects at short wavelengths may be caused by reflection or refraction of the sound by adjacent reinforcing fibers (such as glass fibers) appearing in reinforcing yarns that are woven into a reinforcing fabric and embedded within a solidified polymer resin. At longer wavelengths, phase cancellation effects can be caused by periodically-located strands of reinforcing yarn. Phase cancellation effects raise the insertion loss, that is, the attenuation of the acoustical energy caused by the sonar dome, and interfere with the wave form of the acoustical signal, reducing the effectiveness of the sonar system.

In a prior art reinforced plastic sonar dome, small air bubbles trapped within the solidified polymer resin can create large acoustical discontinuities due to the substantial difference in characteristic impedance between the air in the air bubbles and the materials from which the plastic sonar dome is constructed. The small air bubbles scatter and reflect sound traveling through the sonar dome, increasing the insertion loss of the sonar dome and reducing the effectiveness of the sonar system.

The prior art teaches sonar domes composed of steel or reinforced plastics. The prior art steel or reinforced plastic sonar domes exhibit good mechanical strength but also exhibit significant differences in characteristic impedance from sea water. The prior art also teaches rubber sonar domes that have characteristic impedances closely aligned with that of sea water, but which have poor mechanical strength. Existing technology rubber sonar domes require reinforcement or pressurization to maintain a proper hull form and to protect the sonar transducers. Reinforcement of prior art rubber sonar domes may be with wire or with fiberglass skins. Prior art rubber sonar domes with fiberglass skins potentially can suffer from delamination problems. Prior art wire-reinforced rubber sonar domes require an autoclave for manufacture, which increases the difficulty and hence cost of manufacture when compared to a reinforced plastic sonar dome. Due to their relatively low stiffness, prior art wire-reinforced rubber sonar domes also require pressurization in use, increasing the potential for failure of the sonar system. The prior art does not teach the sonar dome of the present Invention.

BRIEF DESCRIPTION OF THE INVENTION

The invention is a sonar dome composed of a reinforced and acoustically altered solidified polymer resin. The reinforcement and acoustical alteration of the solidified polymer resin are accomplished through incorporation into the solidified polymer resin of yarns composed of a blend of acoustical and structural fibers.

As used in this document, an "acoustical fiber" is a fiber selected principally for its acoustical characteristics and a "structural fiber" is a fiber selected principally for its mechanical characteristics. The acoustical fibers are selected to be acoustically transparent and to match as closely as possible the characteristic impedance of the resulting composite structure to sea water. The acoustical fibers may be selected to have mechanical characteristics that complement the mechanical characteristics of the structural fibers. The structural fibers are selected to provide the necessary mechanical strength and stiffness to the reinforced resin, although the acoustical properties of a structural fiber are factors in selection of the fiber.

Any suitable structural fiber may be used, such as carbon fibers, glass fibers, or aromatic polyamide fibers. Aromatic polyamide fibers (hereinafter "aramid" fibers) include para-aramid nylon fiber, available under the Kevlar® trademark.

Any suitable acoustical fiber may be used, such as ultra-high molecular weight polyethylene fiber or, for some design frequency ranges, polyester fiber.

To form the sonar dome of the Invention, discrete acoustical fibers and structural fibers are selected and mixed together in a random ("stochastic") manner. The mixed acoustical and structural fibers are combined to form a blended yarn. A blended fabric is woven from the blended yarn. Many layers of blended fabric are incorporated into a solidified polymer resin. The reinforced solidified plastic resin, incorporating the acoustical and structural fibers, forms the 'window' of the sonar dome through which sound passes on its way from or to the transducers.

The relative proportions of the acoustical and structural fibers in the blended yarn varies by the location of the yarn through the thickness of the window and by the frequency range of sound intended to pass through the window. The relative proportions of acoustical and structural fibers may be expressed as a ratio of the quantity of acoustical fibers to the quantity of structural fibers. In general, blended fabric woven from blended yarn having a lower ratio of acoustical fibers to structural fibers is used near the inner and outer surfaces of the sonar dome window, while blended yarns having a higher ratio of acoustical fiber to structural fiber are used at the center of the thickness of the sonar dome window. Also in general, the higher the design frequency of sound intended to pass through the window, the larger the ratio of acoustical fibers to structural fibers.

The sonar dome of the Invention substantially reduces the problem of phase effects at short wavelengths by keeping the periodicity of the distribution of the structural and acoustical fibers small compared to the design wavelength. Blending of the acoustical and structural fibers in the sonar dome introduces randomness to the distribution of the acoustical and structural fibers on a small scale. The small-scale random, or stochastic, nature of the acoustical and structural fiber distribution within the blended fabric, and hence within the solidified polymer, prevents the fibers from being periodically distributed. The lack of periodic distribution substantially reduces the phase cancellation effects of the prior art and increases the range of frequencies that may pass through the sonar dome substantially undisturbed. The stochastic distribution of the acoustical and structural fibers of the sonar dome of the Invention effectively renders the sonar dome substantially homogenous for a wide range of frequencies.

The sonar dome and method of the invention reduces the scattering effect of voids and trapped air bubbles within the solidified sonar dome by utilizing a vacuum assisted resin transfer method known as the SCRIMP® process. Any suitable vacuum-assisted resin transfer process may be used. The SCRIMP® process involves feeding the liquid polymer resin into the sonar dome form and around the blended fabric under a partial vacuum. The reduced void and air bubble space within the solidified polymer resin substantially reduces the discontinuities in characteristic impedance within the sonar dome structure, reducing the scattering of sound by the voids and bubbles, and thereby reduces the insertion loss of the sonar dome.

A measure of the capability of a sonar system for comparison to other sonar systems is the Figure of Merit ("FOM"). FOM is the maximum allowable one way transmission loss (for passive sonar) or the maximum allowable two-way transmission loss (for active sonar) that will result in a specified probability of detection of a target under given conditions. The FOM may be increased by increasing the intensity of transmitted sound (for active sonar), decreasing the ambient noise level, increasing the directivity of the receiver, and decreasing the detection threshold. The sonar dome of the Invention decreases the detection threshold, and hence increases the FOM, compared to a reinforced plastic sonar dome that does not utilize the Invention. The sonar dome of the Invention may be manufactured without using an autoclave and has sufficient mechanical strength and stiffness that pressurization is not required during use.

DESCRIPTION OF AN EMBODIMENT

Figure 1:
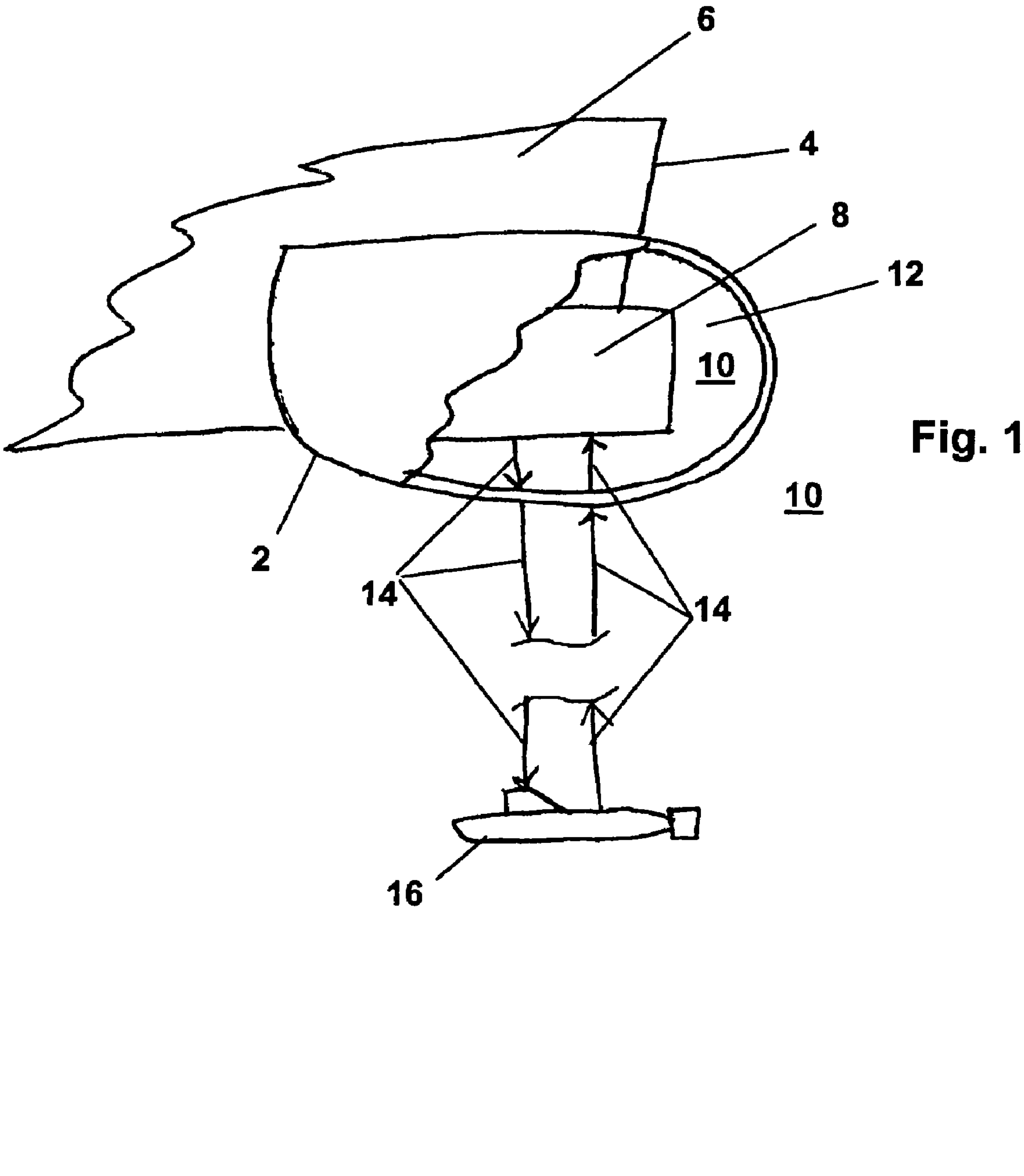
FIG. 1 is a cutaway of the sonar dome of the invention.

The Invention is a sonar dome 2, as illustrated by FIG. 1. The sonar dome 2 is mounted on the bow 4 a vessel 6, particularly an ocean-going surface vessel or submarine. The sonar dome 2 houses an array of transducers 8. The sea water 10 in which the vessel 6 floats also fills the interior volume 12 defined by sonar dome 2. For passive sonar, the transducers 8 are adapted to receive externally-generated sound 14 from an underwater object 16, for example a submarine. For active sonar, the transducers 8 are adapted to send sound 14 and to receive the scattered sound 14 that is reflected from the underwater object 16.

Figure 2:
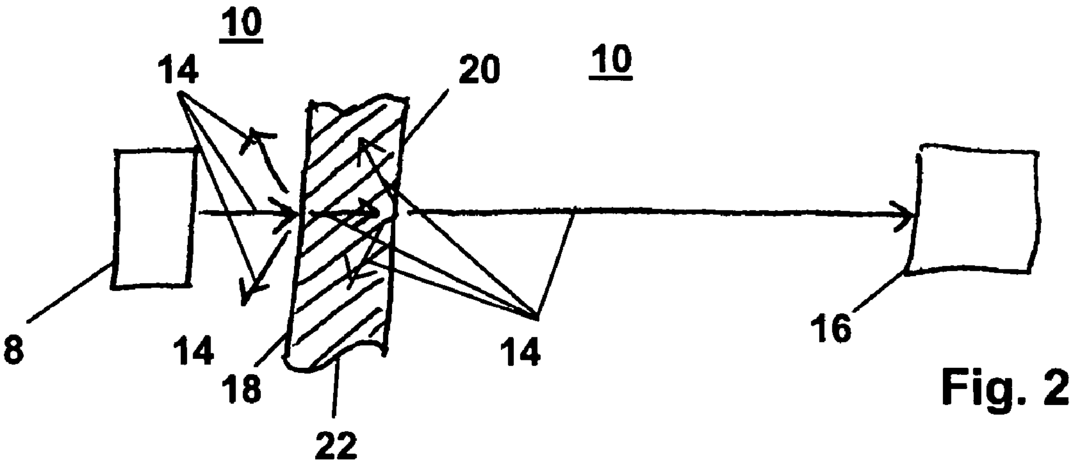
FIG. 2 illustrates sound travel through a sonar dome for active sonar.
Figure 3:
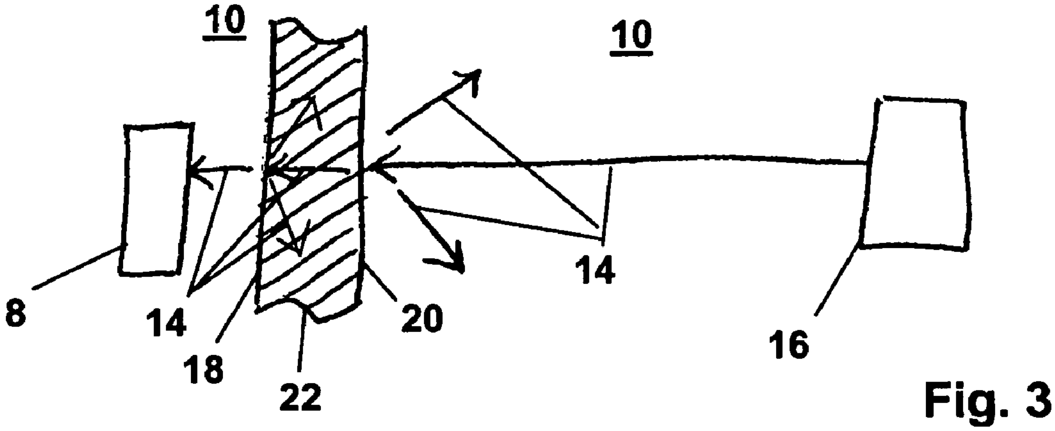
FIG. 3 illustrates sound travel through the sonar dome for passive sonar or for a return of a scattered active sonar signal to the sonar dome.
Figure 4:
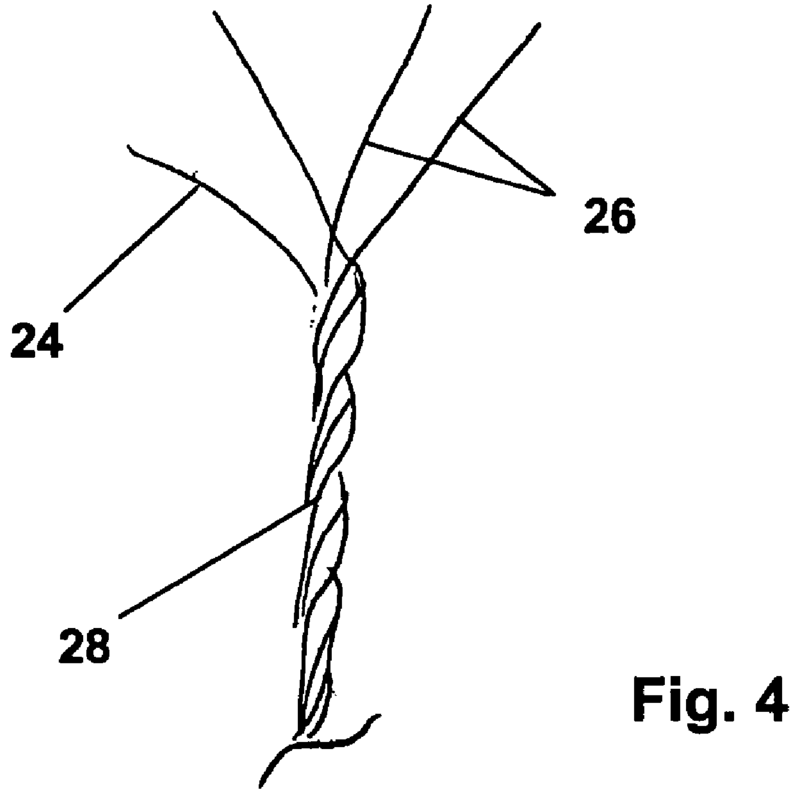
FIG. 4 is a blended yarn.

FIGS. 2 and 3 illustrate the acoustical challenge posed by a sonar dome 2. The sonar dome 2 has an inside surface 18 and an outside surface 20. FIG. 2 illustrates an outgoing sound 14 generated by a transducer 8. The sound 14 is travels from the transducer 8 through the sea water 10 located in the interior volume 12 of the flooded sonar dome 2 between the transducer 8 and the inside surface 18 of the sonar dome 2. The sea water 10 has a characteristic impedance, as does the material of the sonar dome 2. The boundary between the sea water 10 and the inside surface 18 is an acoustical discontinuity. At the discontinuity, a portion of the sound 10 is reflected back into the sea water 10 located within the interior volume 12, reducing the energy of the sound 14 that passes into the sonar dome 2.

From FIG. 2, the sound 14 passing through the sonar dome 2 encounters the outside surface 20 of the sonar dome 2 and the boundary between the sonar dome 2 and the surrounding sea water 10. The boundary between the sonar dome 2 and the sea water 10 is also an acoustical discontinuity and reflects a portion of the sound 14 back into the sonar dome.

The amount of the sound 14 reflected at the inside surface 18 and the outside surface 20 of sonar dome 2 is largely determined by the difference in characteristic impedance of the sea water 10 surrounding the sonar dome 2 and by the characteristic impedance of the sonar dome 2. As shown by FIG. 3, the same reflections and scattering of sound occur for sounds 14 impinging upon the sonar dome 2 from outside the sonar dome 2.

As shown by FIGS. 2 and 3, the sonar dome window 22 is the portion of the sonar dome 2 through with sound 14 is transmitted or received.

FIGS. 4, 5, 6 and 7 illustrate the construction of the sonar dome 2 of the Invention. FIG. 8 is a flow diagram illustrating the method of that construction. From FIGS. 4 and 8, a quantity of structural fibers 24 and a quantity of acoustical fibers 26 are mixed in a predetermined ratio of acoustical fibers 26 to structural fibers 24. The mixing process is inherently stochastic, introducing randomness into the location of each type of fiber 24, 26 in the completed sonar dome 2.

Structural fibers 24 add mechanical strength and stiffness to the completed sonar dome 2. The structural fiber 24 is selected to have a high modulus of elasticity and strength. The structural fiber 24 has adequate stiffness along the axis of the structural fiber 24 to provide a suitable static load resistance to the composite sonar dome 2, for example, to prevent the sonar dome 2 from deforming under the pressure exerted by the sea water 10 through which a vessel moves. A structural fiber 24 preferably is selected that does not significantly alter the acoustic transparency of the composite sonar dome 2.

Carbon fibers and glass fibers are the preferred structural fibers, but other fibers may be used, such as aramid fibers. Carbon fibers known in the industry as "intermediate modulus" polyacrylnitrile (PAN) based fibers have proved suitable in practice, such as T300-3000 manufactured by Toray Industries. Glass fiber has also proved suitable in practice, such as E-Glass 205 yard/lb yield available from multiple sources.

Acoustical fiber 26 is selected to have a characteristic impedance as close to that of sea water 10 as possible and hence to render the composite sonar dome 2 as acoustically transparent as possible. The speed of sound through sea water 10, and hence the characteristic impedance of the sea water 10, is frequency-dependant. As a result, an acoustical fiber 26 that has an optimal characteristic impedance for a particular sonar design frequency may not be optimal for another frequency. Ultra-high molecular weight polyethylene fiber has proven suitable as an acoustical fiber 26 in practice, for example Spectra S-900 or S-1000 (1300 denier) available from the Honeywell Corporation. Polyester fiber is a suitable acoustical fiber 26 for some design frequency ranges. Acoustical fibers 26 preferably have a speed of sound for frequencies between 1 kHz and 100 kHz of between 5000 m/sec and 10000 m/sec along the axis of the fiber and between 1200 m/sec and 2000 m/sec transverse to the axis of the fiber.

Although the acoustical fiber 26 is selected primarily for its acoustical properties, the acoustical fiber 26 may have mechanical characteristics that complement the mechanical characteristics of the structural fibers 24. For example, ultra-high molecular weight polyethylene fiber is very strong in tension but features high elongation before fracture compared to, for example, carbon fiber. Ultra-high molecular weight polyethylene will deflect approximately ten times as much as a carbon fiber for the same applied load. The relatively low modulus of elasticity and high strength of the ultra-high molecular weight polyethylene provide enhanced durability (resistance to abrasion) and damage tolerance (resistance to damage from collision) to the composite sonar dome 2. Polyester fiber used as acoustical fiber 26 provides durability and damage resistance benefits as well, but the benefits are attenuated compared to the ultra-high molecular weight polyethylene fiber.

The speed of sound of a design frequency propagating through the acoustical fibers 26 will be closer to the speed of sound through water for the design frequency than will the speed of sound propagating through the structural fibers 24. One way to express this relationship is in terms of absolute values. The absolute value of the difference between the speed of sound propagating through the acoustical fiber 26 and the speed of sound propagating through water will be less than the absolute value of the difference in the speed of sound propagating through the structural fiber 24 and the speed of sound propagating through water, all at the design frequency.

The mixed structural and acoustical fibers 24, 26 are formed into a blended yarn 28 using conventional methods and equipment for forming yarns 28 to be imbedded in a reinforced plastic. A twist is introduced into the blended yarn 28 by conventional means. The twist of the blended yarn 28 is selected to be the minimum that will maintain the structural integrity of the blended yarn 28 required for weaving while not interfering with the mechanical strength of the finished sonar dome 2. Blended yarns 28 having the following parameters have proved successful in practice: three strands of Spectra S-1000 1300 denier acoustical fiber blended with one strand of T300-3000 structural fiber using one twisting turn per two inches of blended yarn, or three strands of Spectra S-1000 1300 denier acoustical fiber blended with one strand of 205 yield E-Glass structural fiber using one twisting turn per inch of yarn length.

Figure 5:
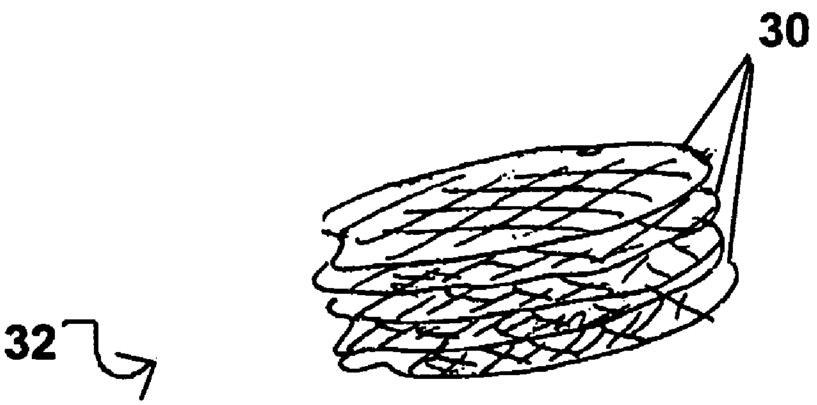
FIG. 5 is a blended fabric stack.

As shown by FIGS. 8 and 5, the blended yarn 28 is woven into sheets or a web of a blended fabric 30 using conventional methods and equipment. Blended fabric 30 having the following characteristics has proven successful in practice: a plain weave configuration with eight blended yarns 28 of the type described above per inch in both the warp and weft directions and a variation where the warp blended yarns 28 contain carbon fibers and the weft blended yarns 28 contain E-Glass fibers.

The sonar dome 2 of the Invention also may be constructed utilizing a blended fiber felt rather than a woven blended fabric 30, as is known in the art of reinforced plastics.

The one or more layers of blended fabric 30 are laid up in a mold of a sonar dome 2. Due to the high strength required of the sonar dome, multiple layers of blended fabric may be utilized to form a blended fabric stack 32. A typical blended fabric stack 32 for a Navy vessel will include 30 to 80 layers of blended fabric 30 depending on operational details of the sonar system. The blended fabric stack 32 may be laid up either wet or dry, using conventional reinforced plastic technology. In a wet lay up, each sheet of blended fabric 30 is wetted with a liquid plastic resin prior to placing the sheet of blended fabric in the mold. In the dry lay up method, all sheets of blended fabric 30 are placed within the mold without wetting. The liquid plastic resin then is introduced to the stack 32 of sheets of blended fabric 30 while the blended stack 32 is in the mold.

As shown by FIG. 8, a vacuum molding process is a preferred alternative to the wet or dry lay up process. The vacuum molding process reduces voids and air bubbles within the reinforced plastic structure of the sonar dome and allows a higher-strength reinforced plastic sonar dome 2 than would be otherwise possible without resort to an autoclave. The reduction in voids and air bubbles also reduces acoustical discontinuities within the structure of the sonar dome 2, reducing the insertion loss and rendering the sonar dome 2 more acoustically homogeneous. A vacuum molding process that has proved suitable in practice is described in U.S. Pat. No. 4,902,215 to Seamann issued Feb. 20, 1990, the teachings of which are incorporated herein by reference.

The liquid plastic resin is preferably a catalyzed epoxy resin. High-elongation epoxy resins are most successful due to the need of the sonar dome 2 to resist fatigue and to exhibit high microcracking resistance. Although any suitable resin may be utilized, the preferred epoxy resin is SC-780, available from Applied Poleramic, Inc. Benecia, Calif.

Figure 6:
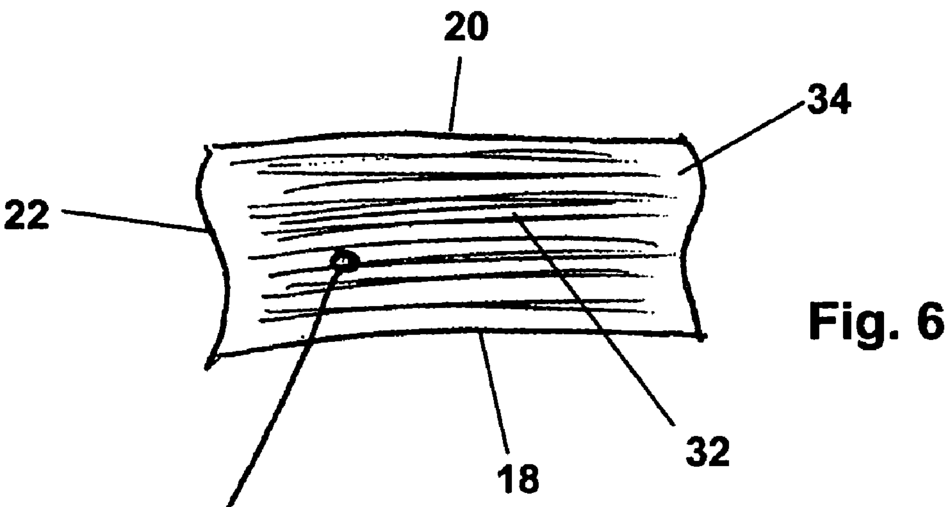
FIG. 6 is a cross section of the sonar dome window of the Invention.
Figure 7:
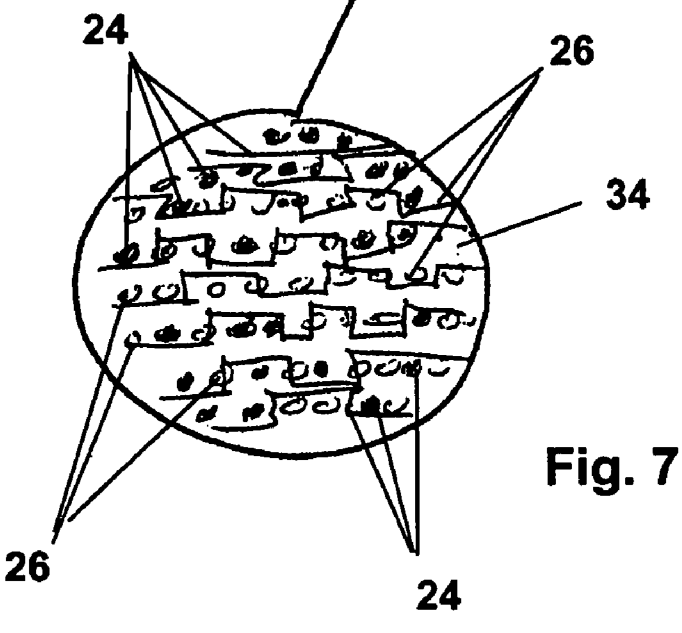
FIG. 7 is a magnified detail of FIG. 6.
Figure 8:
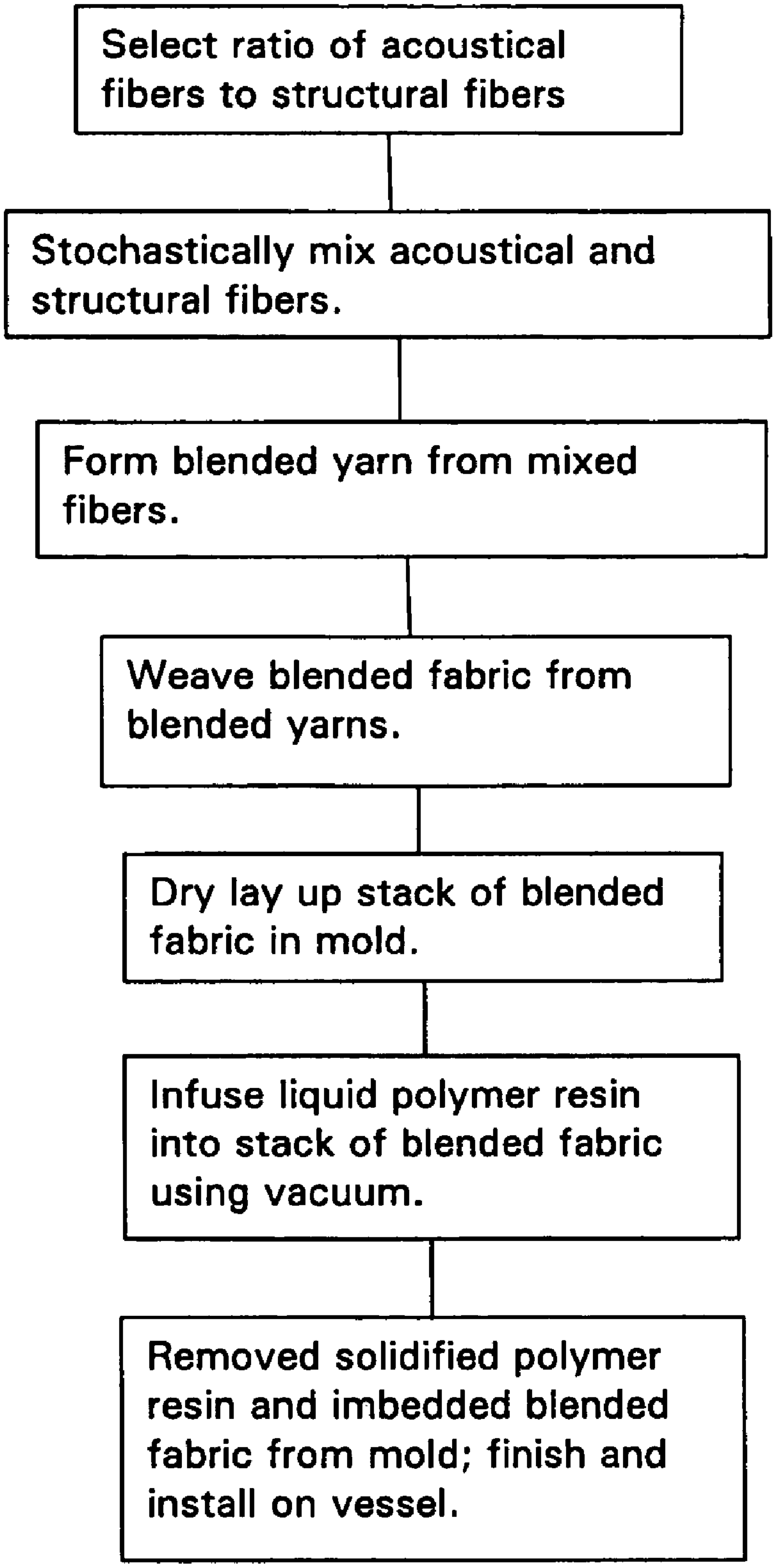
FIG. 8 is a flow diagram of the method of the Invention.

The liquid epoxy resin cures in the mold to a solidified epoxy resin 34, shown by FIGS. 6 and 7. As shown by FIG. 8, the finished sonar dome 2 is removed from the mold and is installed on a vessel 6. FIG. 6 is a cross section of the sonar dome window 22 of the completed sonar dome 2 and FIG. 7 is a magnified detail of FIG. 6. As shown by FIGS. 6 and 7, the stack 32 of blended fabrics 30 is incorporated within the solidified epoxy resin 34. Due to the stochastic mixing of the structural 24 and acoustical 26 fibers, the structural and acoustical fibers 24, 26 are generally randomly distributed within each blended yarn 28 on a small scale; that is, on a scale that is small compared with the design wavelength of the sound intended to pass through the sonar dome window 22. The structural and acoustical fibers 24, 26 hence are generally randomly distributed on a small scale 20 within each blended fabric 30 and within the sonar dome window 22. This small scale random distribution of the acoustical and structural fibers 24, 26 renders the sonar dome window 22 acoustically homogenous on a small scale, reducing interference effects.

The ratio of the quantity of acoustical fibers 26 to the quantity of structural fibers 24 preferably will be selected based on the design wavelength of sound 14 intended to pass through the sonar dome window 22, based upon the structural requirements of the sonar dome 2, and based upon the location of the strand of blended yarn 28 within the cross section of the sonar dome window 22. A blended yarn 28 having a low ratio of acoustical fibers 26 to structural fibers 24 will be comparatively strong, while a blended yarn 28 having a high ratio of acoustical fibers 26 to structural fibers 24 will be comparatively proficient at transmitting sound 14, particularly high frequency/short wavelength sound 14. The design frequency is important because for optimal sound 14 transmission at short wavelengths, a higher ratio of acoustical fibers 26 to structural fibers 24 is needed than at longer wavelengths.

The structural requirements of the sonar dome 2 are important because the sonar dome 2 must be adequately strong to protect the sonar transducers 8 from damage. For an application where high mechanical loads on the sonar dome 2 are expected, a ratio of acoustical fibers 26 to structural fibers 24 should be selected that is lower than an application were low mechanical loads are expected.

The location of the blended yarn 28 within the cross section of the sonar dome window 22 is a consideration because the ratio of acoustical to structural fibers is not uniform through the thickness of the sonar dome window 22. To optimize the strength of the sonar dome 2 while also maintaining good acoustical transmission capability, blended fabrics 30 having relatively great strength are selected for the outside and inside surfaces 18, 20 of the cross section of the sonar dome window 22 while blended fabric 30 having superior acoustical properties are selected for the center of the cross section of the sonar dome window 22.

Blended fabrics 30 having relatively great strength are those having a relatively low ratio of acoustical fibers 26 to structural fibers 24 and preferably are selected for layers of blended fabric 30 that will be proximal to the inside surface 18 and the outside surface 20 of the sonar dome window 22. Blended fabrics 30 having superior acoustical properties are those having a high ratio of acoustical fibers 26 to structural fibers 24 and such blended fabric 30 preferably is located toward the middle of the cross section of the sonar dome window 22, that is, distal to the inside surface 18 and outside surface 20 of the sonar dome window 22.

Figure 9:
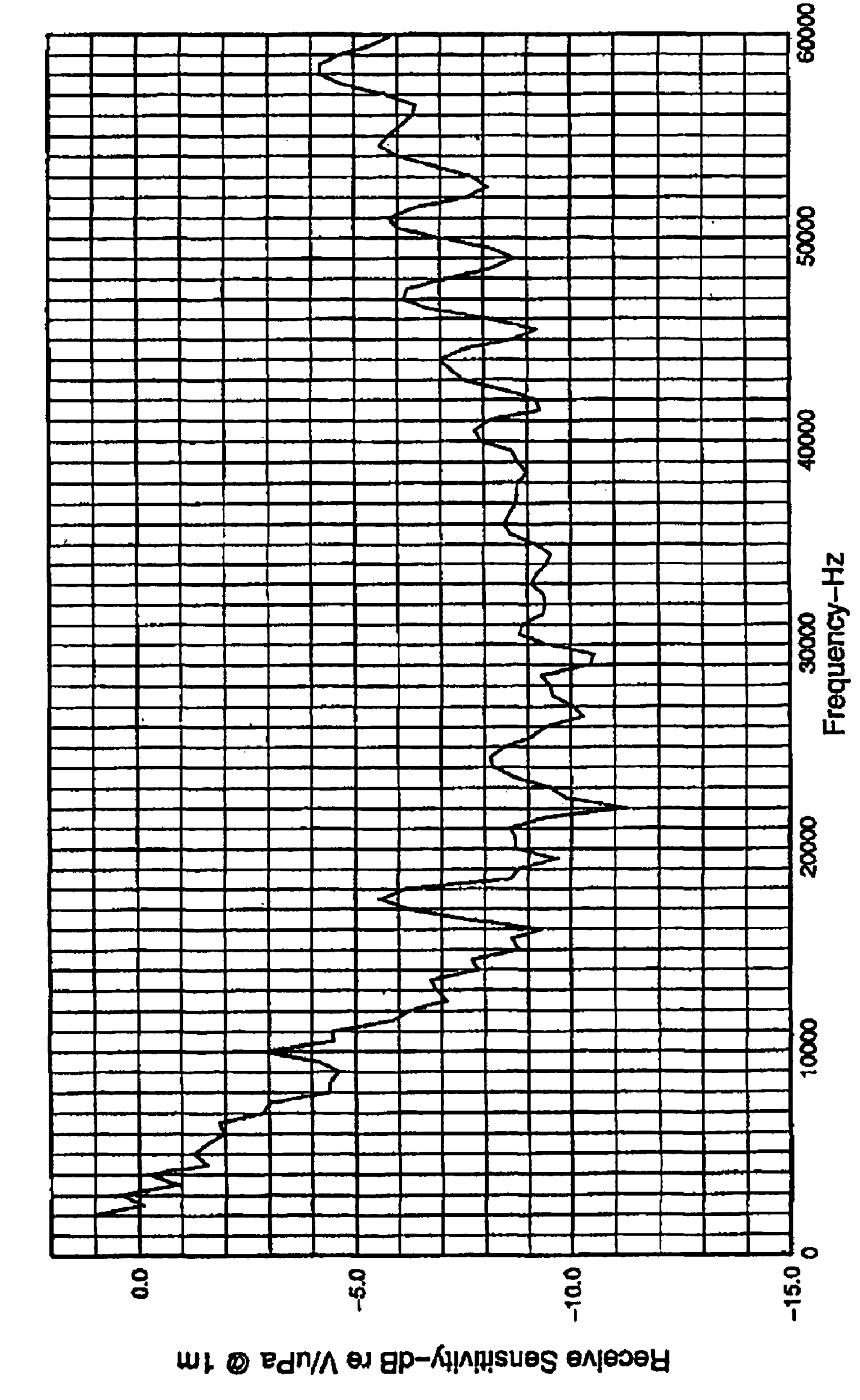
FIG. 9 shows acoustical test results of a prior art composite panel.
Figure 10:
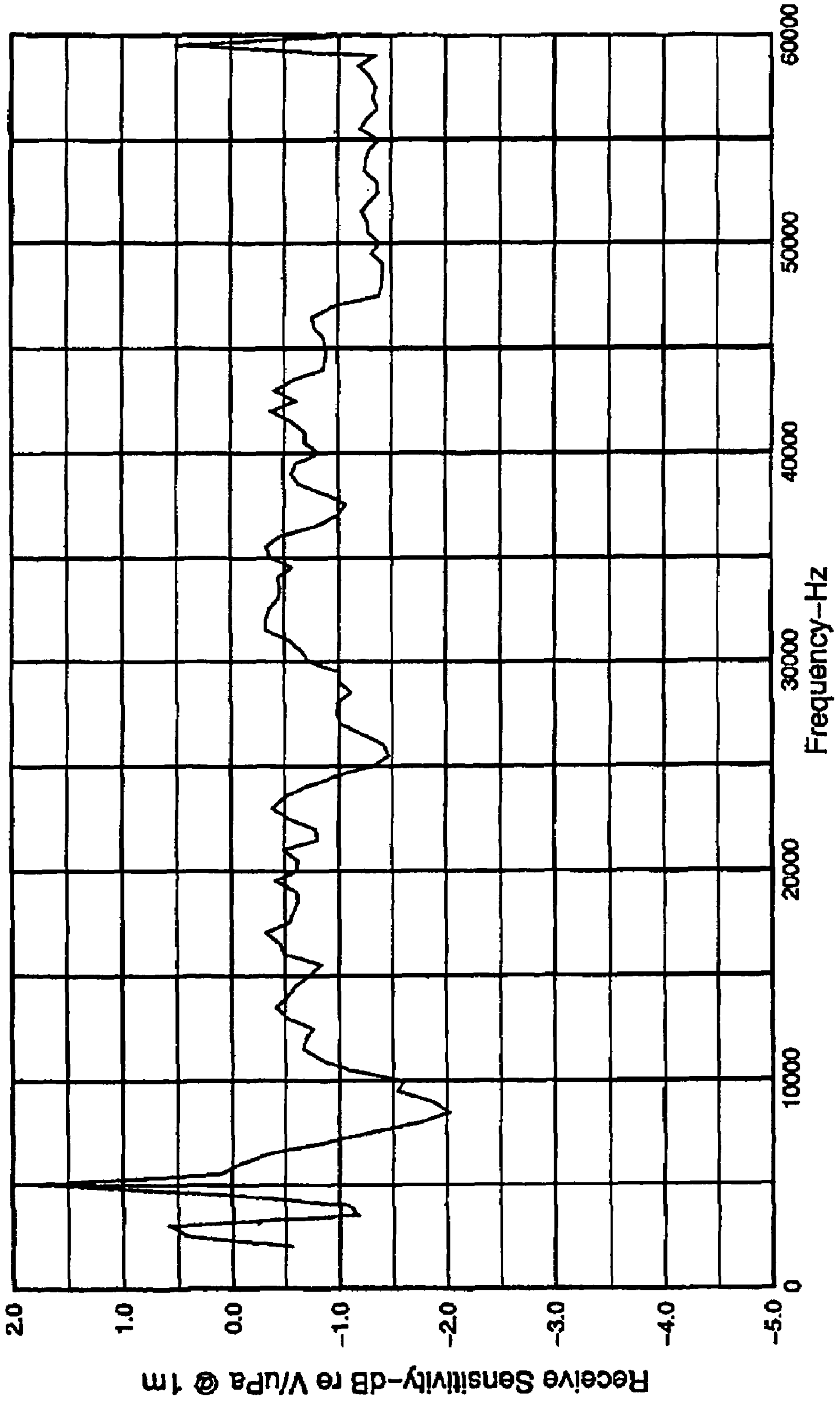
FIG. 10 shows acoustical test results of a composite panel of the Invention.

Acoustical testing of panels constructed according to the Invention demonstrated that incorporation of acoustical fibers 26 into the blended yarns 28 and blended fabrics 30 provided improved insertion loss and hence will provide good sonar dome 2 performance. FIGS. 9 and 10 show the results of acoustical testing of two composite panels. The first composite panel was reinforced with E-Glass fabric and did not include acoustical fibers. The second composite panel was reinforced with a blended fabric 30 composed of E-Glass structural fibers and Spectra acoustical fibers, as described above. Both composite panels were about 1 meter square and nominally 18 mm thick. For testing, each panel was mounted between a sound source and a hydrophone instrument located 15 cm behind the panel.

FIG. 9 shows the insertion loss for the first composite panel reinforced with E-Glass only and that did not include acoustical fibers. Insertion losses range from 3 to 10 dB over transmit frequencies of 10-60 kHz.

FIG. 10 shows insertion losses for the second composite panel reinforced with the blended fabric of the Invention. In this case, insertion losses were less than 1.5 db across the 10-60 kHz frequency range. Mechanical testing showed that the second composite panel, reinforced with blended fabric, retained sufficient strength and stiffness to meet applicable requirements.

In describing the above embodiments of the invention, specific terminology and simplification of data was selected for the sake of clarity and brevity. However, the invention is not intended to be limited to the specific terms so selected, and it is to be understood that each specific term includes all technical equivalents that operate in a similar manner to accomplish a similar purpose.

I claim:

1. A sonar dome to cover transducers of a sonar system of a vessel, the sonar dome comprising:

a. a solidified polymer resin, said solidified polymer resin defining an interior volume, said interior volume being configured to cover said transducers;

b. a substantially stochastic mixture of a plurality of acoustical fibers and a plurality of structural fibers, said stochastic mixture of said plurality of acoustical fibers and said plurality of structural fibers being imbedded within said solidified polymer resin, said acoustical fibers being selected to have a predetermined acoustical characteristic, said structural fibers being selected to have a predetermined structural characteristic.

2. The sonar dome of claim 1 wherein said predetermined acoustical characteristic of said plurality of said acoustical fibers comprises: a one of said plurality of said acoustical fibers having an acoustical fiber speed of sound for a sound of a selected frequency propagating through said acoustical fiber, a one of said plurality of said structural fibers having a structural fiber speed of sound for said sound of said selected frequency propagating through said structural fiber, an absolute value of a difference between said acoustical fiber speed of sound and a speed of sound for said sound of said selected frequency propagating through water being less than said absolute value of said difference between said structural fiber speed of sound and said speed of sound for said sound of said selected frequency propagating through said water.

3. The sonar dome of claim 2 wherein the sonar dome has a predetermined design sound wavelength, said acoustical fibers having an acoustical fiber quantity, said structural fibers having a structural fiber quantity, said blended fabric having a predetermined ratio of said acoustical fiber quantity to said structural fiber quantity, said predetermined ratio being selected based upon said pre-determined design sound wavelength.

4. The sonar dome of claim 3 wherein said substantially stochastic mixture of said plurality of acoustical fibers and said plurality of structural fibers is arrayed in a blended yarn, said blended yarn is incorporated in a woven blended fabric, said blended fabric being imbedded within said solidified polymer rosin.

5. The sonar dome of claim 4 wherein said blended fabric is one of a plurality of said blended fabrics, the sonar dome further comprising: said plurality of said blended fabrics being formed into a multiple-layered stack of said blended fabrics, said stack of said blended fabrics being imbedded within said solidified polymer resin.

6. The sonar dome of claim 5 wherein each of said plurality of said Wended fabrics within said stack has a one of a plurality of said ratios of said acoustical fiber quantity to said structural fiber quantity, said one of said plurality of said ratios being selected based upon a pre-determined design wavelength of said sound.

7. The sonar dome of claim 6 wherein said predetermined ratio of said acoustical fibers to said structural fibers for a one of said plurality of said blended fabrics is determined by a location of said one of said plurality of blended fabrics within said stack of said blended fabrics.

8. The sonar dome of claim 7 wherein said sonar dome has an inside surface and an outside surface, said ratio of said acoustical fiber quantity to said structural fiber quantity for said woven fabric proximal to said inside surface is greater than said ratio for said woven fabric distal to said inside and said outside surfaces, and said ratio of said acoustical fiber quantity to said structural fiber quantity for said woven fabric proximal to said outside surface is grater than said ratio for said woven fabric distal to said inside and said outside surfaces.

9. The sonar dome of claim 8 wherein said structural fiber is selected from a list consisting of carbon fiber, aramid and glass.

10. The sonar dome of claim 8 wherein said solidified polymer resin is a high-elongation resin.

11. The sonar dome of claim 8 wherein said acoustical fiber is selected from a list consisting of ultra-high molecular weight polyethylene fiber and polyester fiber.

12. The sonar dome of claim 1, said predetermined acoustical characteristic of said plurality of said acoustical fibers comprising:

said acoustical fibers having a speed of sound for frequencies between 1 kHz and 100 kHz of between 5000 m/sec and 1000 m/sec along the axis of the fiber and 1200 m/sec and 2000 m/sec transverse to the fiber length.

13. A sonar dome, the sonar dome comprising:

a. a plurality of acoustical fibers, said acoustical fibers being selected to have a predetermined acoustical characteristic;

b. a plurality of structural fibers, said structural fibers being selected to have a predetermined structural characteristic;

c. said plurality of said acoustical fibers and said plurality of said structural fibers being formed into a blended yarn, said blended yarn being formed into a blended fabric;

d. a solidified polymer resin, said blended fabric being incorporated within said solidified polymer resin.

14. The sonar dome of claim 13 wherein said blended yarn is formed of a mixture of said acoustical fibers and said structural fibers, said mixture of said acoustical fibers and said structural fibers being substantially stochastic.

15. The sonar dome of claim 14 wherein said predetermined acoustical characteristic of said acoustical fibers comprises: a one of said plurality of said acoustical fibers having a speed of sound for propagation of a sound of a selected frequency through said acoustical fiber, said speed of sound for said sound of said selected frequency propagating through said acoustical fiber approximating said speed of sound for said sound of said selected frequency propagating through water.

16. The sonar dome of claim 15, the sonar dome further comprising: a sonar window defined by said solidified polymer resin and by said blended fabric incorporated within said solidified polymer resin, said sonar window having a predetermined design wavelength of said sound, said blended fabric having a predetermined ratio of said acoustical fibers to said structural fibers, said predetermined ratio being selected based upon said pre-determined design wavelength of said sound.

17. The sonar dome of claim 16 wherein said window has a thickness, an inside surface and an outside surface, the sonar dome further comprising: said blended fabric being a one of a plurality of sold blended fabrics, said plurality of said blended fabrics being formed into a multiple-layered stack of said blended fabrics, said stack of said blended fabrics being incorporated within said solidified polymer resin, each of said plurality of said blended fabrics within said stack having a one of a plurality of said predetermined ratios of said acoustical fibers to said structural fibers, said one of said plurality of said predetermined ratios of said acoustical fibers to said structural fibers for said one of said plurality of said blended fabrics being determined by a location of said one of said plurality of blended fabrics within said stack of said blended fabrics.

18. The sonar dome of claim 17 wherein a one of said plurality of said blended fabrics located proximal to said inside surface of said window exhibits said predetermined ratio of said acoustical fibers to said structural fibers that is lower than said predetermined ratio exhibited by another one of said plurality of said blended fabrics that is located distal to said inside surface and said outside surface of said window, and another one of said plurality of said blended fabrics located proximal to said outside surface of said window exhibits said predetermined ratio of said acoustical fibers to said structural fibers that is lower than said predetermined ratio exhibited by another one of said plurality of said blended fabrics that is located distal to said inside surface and said outside surface of said window.

19. The sonar dome of claim 15 wherein said structural fiber has a structural fiber modulus of elasticity and wherein said acoustical fiber has an acoustical fiber modulus of elasticity, said structural fiber modulus of elasticity being greater than said acoustical fiber modulus of elasticity and wherein said structural fiber is selected from the list consisting of carbon fiber, aramid fiber and glass fiber.

20. The sonar dome of claim 14, said predetermined acoustical characteristic of said plurality of said acoustical fibers comprising: said acoustical fibers having a speed of sound for frequencies between 1 kHz and 100 kHz of between 5000 m/sec and 10000 m/sec along the axis of the fiber and 1200 m/sec and 2000 m/sec transverse to the fiber length.

* * * * *

UNITED STATES PATENT AND TRADEMARK OFFICE
CERTIFICATE OF CORRECTION

PATENT NO. : 7,408,842 B2
APPLICATION NO. : 11/394329
DATED : August 5, 2008
INVENTOR(S) : Anthony A. Caiazzo It is certified that error appears in the above-identified patent and that said Letters Patent is hereby corrected as shown below:

Claim 4, column 9, line 17, the reference to “rosin” should be to --resin--.

Claim 6, column 9, line 24, the reference to “Wended” should be to --blended--.

Claim 8, column 9, line 41, the reference to “grater” should be to --greater--.

Claim 12, column 9, line 56, the reference to “1000 m/sec” should be to --10000 m/sec--.

Claim 17, column 10, line 28, the reference to “sold” should be to --said--.

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,408,842 B2
APPLICATION NO. : 11/394329
DATED : August 5, 2008
INVENTOR(S) : Anthony A. Caiazzo It is certified that error appears in the above-identified patent and that said Letters Patent is hereby corrected as shown below:

Specification at Column 1, line 5, immediately prior to the 'Background of the Invention,' the following should be added:

STATEMENT OF GOVERNMENT INTEREST

The U.S. Government has a paid-up license in this invention and the right in limited circumstances to require the patent owner to license others on reasonable terms as provided for by the terms of contract N66604-02-C-5416 awarded by the United States Navy, Naval Underwater Center, Newport, RI.

Signed and Sealed this

Sixteenth Day of February, 2010

David J. Kappos
*Director of the United States Patent and Trademark Office*

UNITED STATES PATENT AND TRADEMARK OFFICE

CERTIFICATE OF CORRECTION

PATENT NO. : 7,408,842 B2
APPLICATION NO. : 11/394329
DATED : August 5, 2008
INVENTOR(S) : Anthony A Caiazzo It is certified that error appears in the above-identified patent and that said Letters Patent is hereby corrected as shown below:

In the Specification at column 1, line 5, immediately prior to the "Background of the Invention," replace the paragraph labeled "Statement of Government Interest" with the following:

STATEMENT OF GOVERNMENT INTEREST
The Government of the United States, as represented by the Secretary of the Navy, shall have an irrevocable, non-exclusive, non-transferable, paid-up and royalty-free license to practice or have practiced on its behalf throughout the world the content and claimed embodiments of this invention.

Signed and Sealed this
Thirty-first Day of May, 2011

David J. Kappos
*Director of the United States Patent and Trademark Office*